United States Patent [19]

Donnelley

[11] 4,196,566
[45] Apr. 8, 1980

[54] AQUATIC WEED CUTTER

[76] Inventor: Elliott R. Donnelley, 348 Eden Rd., Palm Beach, Fla. 33480

[21] Appl. No.: 894,337

[22] Filed: Apr. 7, 1978

[51] Int. Cl.$^2$ .................................. A01D 44/00
[52] U.S. Cl. ................................. 56/8; 56/295
[58] Field of Search ............... 56/8, 9, 295, 233–235, 56/13.4, 13.6

[56] References Cited

U.S. PATENT DOCUMENTS

| | | | |
|---|---|---|---|
| 1,839,380 | 1/1932 | Druppel | 56/8 |
| 2,550,144 | 4/1951 | Flintser | 56/295 |
| 2,635,406 | 4/1953 | Chauvin | 56/8 |
| 2,682,142 | 6/1954 | Clark | 56/295 |
| 2,908,128 | 10/1959 | Mauro | 56/295 |
| 3,049,854 | 8/1962 | Denney | 56/13.4 |
| 3,068,630 | 12/1962 | Caldwell | 56/13.6 |
| 3,091,906 | 6/1963 | Hall | 56/13.4 |
| 3,115,739 | 12/1963 | Thoen et al. | 56/13.6 |
| 3,541,769 | 11/1970 | Grinwald | 56/9 |
| 3,681,903 | 8/1972 | Phillips | 56/295 |
| 3,848,399 | 11/1974 | Makeham | 56/295 |
| 3,884,018 | 5/1975 | Chaplin | 56/9 |
| 3,972,158 | 8/1976 | Lindstrom | 56/13.6 |
| 4,072,195 | 2/1978 | Carlson | 56/295 |

Primary Examiner—Louis G. Mancene
Assistant Examiner—Paul J. Hirsch
Attorney, Agent, or Firm—Malin & Haley

[57] ABSTRACT

An aquatic weed cutter for cutting aquatic plants and their root systems. The aquatic weed cutter includes a water vehicle having a drive system connected to at least two shafts that project out of the vehicle. Each shaft has a circular cutting blade mounted at the distal end of the shaft. The cutting blades are positioned for rotation in a generally vertical plane for cutting aquatic plants and their root systems, as well as for propelling the vehicle through the water. The drive system is also used to control the position of the shafts below the surface of the water in order to position the tips of the cutting blades at various distances below as well as above the surface of the water bed. The shafts are positioned from one another in order to provide an overlapping relationship between each cutting blade. A forward cleaning blade is placed forward of each of the cutting blades with teeth having leading and trailing pitched portions to keep the cutting blades clean of debris.

2 Claims, 14 Drawing Figures

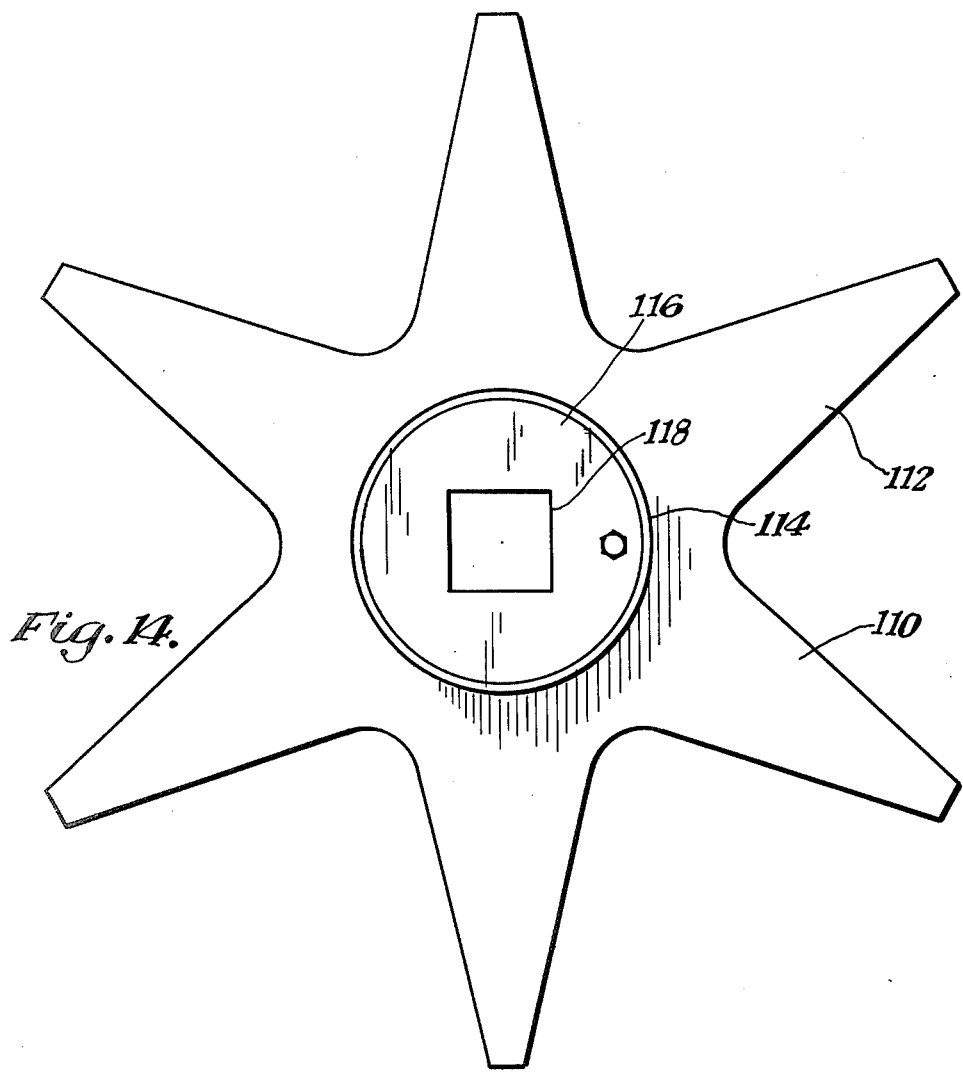
Fig. 14.
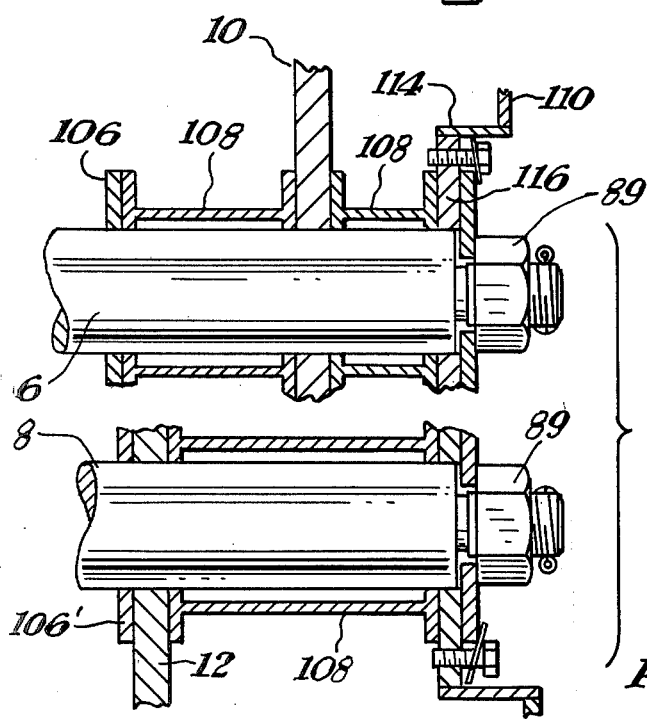
Fig. 13.
Fig. 12.

AQUATIC WEED CUTTER

BACKGROUND OF THE INVENTION

In the past, aquatic weed cutter vessels have been designed to sever the water plants from their root systems above the surface of the water bed. Also, various types of vessels transporting reapers have been used to gather and remove from the water floating plants and plants severed from their root systems. Prior art vessels are propelled through the water by a first power system and the cutters and reapers are driven by an independent power system.

BRIEF DESCRIPTION OF ONE PREFERRED EMBODIMENT

A new and improved aquatic weed cutter for cutting aquatic plants and their root systems into small parts, which includes a water vehicle with a drive system for driving at least two rotating cutting blades that are utilized to cut aquatic plants and their root systems, as well as to propel the vehicle through the water. The drive system also includes a control means to provide vertical movement of the shafts that project out of the aquatic weed cutter vehicle in order to position the distal end of the rotating cutting blades below the upper surface of the water bed. The end portion of the blades cut the body of the plants, including the roots below the surface of the water bed.

Also, the drive system independently controls the clockwise or counter-clockwise movement of each shaft and its cutting blade to provide the vehicle propulsion means. One cutting blade is positioned ahead of the other cutting blade with the center line of each shaft spaced from the adjacent shaft center line a distance less than the diameter of the cutting blade and greater than the radius of the cutting blade.

Each rotating cutting blade has a plurality of teeth extending outwardly from the main body. In the preferred embodiment, every other tooth positioned along the circumference of the cutting blade projects radially, outwardly a greater distance than the adjacent tooth. Also, each short alternate tooth is offset to provide a pitched cutting blade that is used to propel the aquatic weed cutter vehicle through the water at a controlled cutting speed. A forward cleaning blade may be placed forward of each cutting blade to keep the cutting blade clean of debris.

It is an object of this invention to provide an aquatic weed cutter device having rotating cutting blades and cleaning blades that are utilized for the combined function of cutting water born aquatic plants including their root systems below a water bed, for propelling the aquatic weed cutter device along its cutting path, and for cleaning the cutting blades.

Another object of this invention is to provide at least two rotating blades that are movable toward and away from the surface of the water in order to position the blades below the surface of the water bed in order to engage the aquatic plant root systems.

Another object of this invention is to provide at least two rotating blades that are independently rotatable in order to maneuver the aquatic weed cutter vehicle in any direction in the water.

A further object of this invention is to provide a non-complex device for cutting aquatic plants and their root systems by means of the aquatic weed cutter vehicle propulsion system.

An additional object of this invention is to provide cleaning blades ahead of the cutting blades to clean the cutting blades.

In accordance with these and other object which will be apparent hereinafter, the instant invention will now be described with particular reference to the accompanying drawings.

BRIEF DESCRIPTION OF THE DRAWINGS

In the drawings:

FIG. 12 is an end view of the top of a cutting blade;

FIG. 13 is a longitudinal section of one half of each of the cutting blade drive shafts showing a portion of the cutting blades and cleaning blades; and FIG. 14 is a partial front view of a cleaning blade.

DESCRIPTION OF ONE PREFERRED EMBODIMENT

Figures 1, 2, 4:
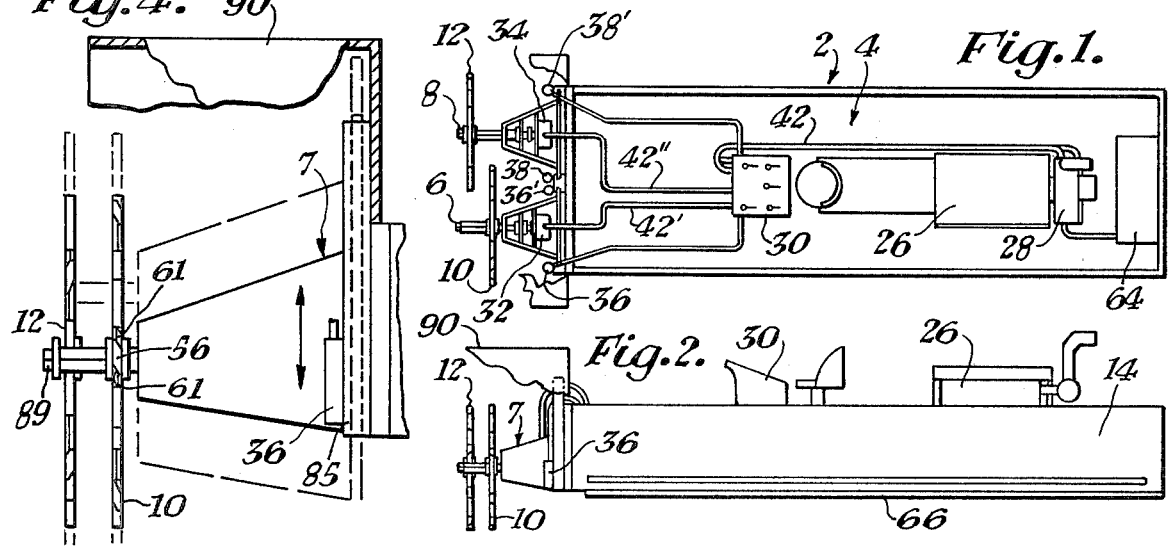
FIG. 1 is a top view of the aquatic weed cutting vehicle, partially in cross-section.
FIG. 2 is a side view of the aquatic weed cutting vehicle.
FIG. 4 is a side view of the forward portion of the aquatic weed cutting vehicle.

Referring now to the drawings, and in particular to FIGS. 1 and 2, the aquatic weed cutter, generally shown as 2, includes a drive system 4, shafts 6 and 8, and cutting blades 10 and 12. The aquatic weed cutter is supported in the water by a vehicle, illustrated as a boat 14. The boat has a forward portion 16, an aft portion 18, sides 20 and 22, and a bottom 24. The drive system 4 includes a motor 26 connected to a hydraulic pump 28 which is connected to a hydraulic control system 30. The hydraulic control system 30 is connected to and controls the hydraulic shaft drive means 32 and 34 and hydraulic piston means 36 and 38.

The gasoline or diesel motor 26 rotates the drive shaft in order to power the main hydraulic pump 28 to drive the pump motors 32 and 34. The hydraulic fluid from pump 28 is connected to the control means 30 and to hydraulic drive means or pump motors 32 and 34, through the hydraulic lines 42, 42' and 42". The drive means 32 and 34 rotate the shafts 6 and 8 through coupling means 32 and 34. The control system, through the control means 30, allows each cutting blade 10 and 12 to be rotated independently either clockwise or counter-clockwise.

Figure 5:
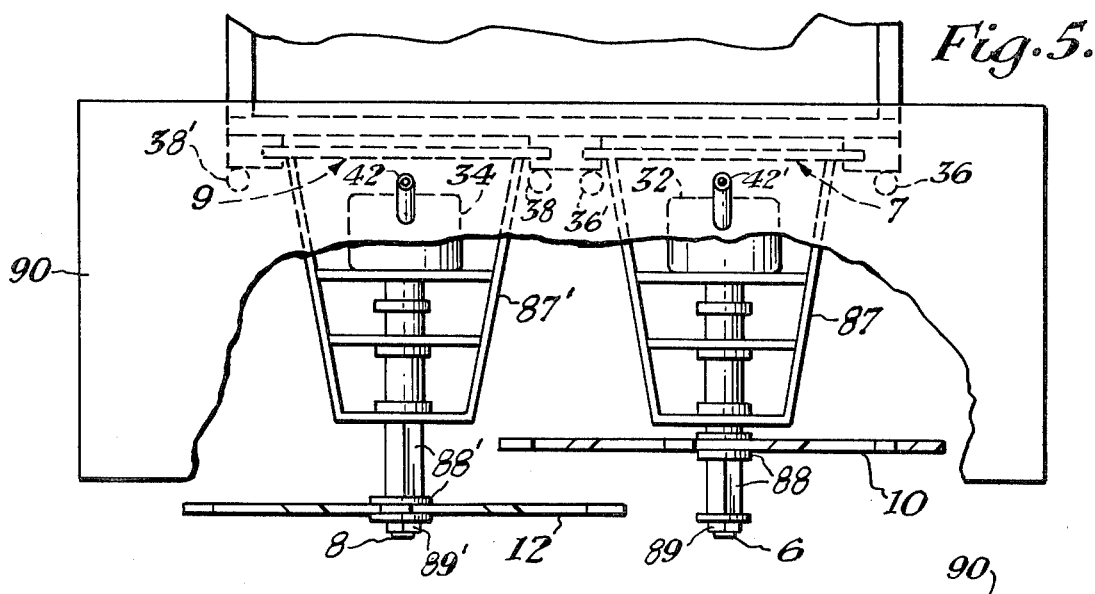
FIG. 5 is a top view of the forward portion of the aquatic weed cutting vehicle.

Each cutting blade is independently mounted on the front of the boat for movement up or down by hydraulic pistons 36' and 36" or hydraulic pistons 38' and 38". Each cutting blade 10 and 12, motors 32 and 34, and shaft 6 and 8 are connected together on a moving frame 7 and 9 as shown in FIGS. 3, 4, and 5.

Figure 7:
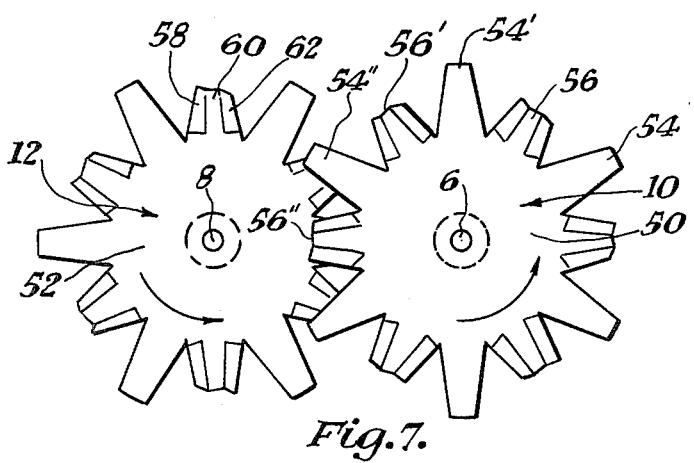
FIG. 7 is a front view of a cutting blade connected to its shaft and a second cutting blade connected to the adjacent shaft.
Figure 8:
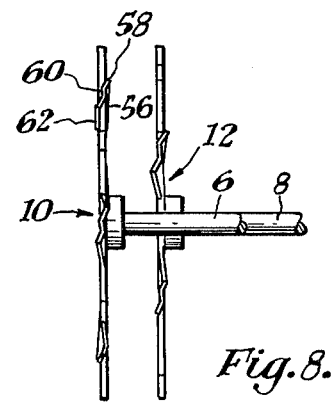
FIG. 8 is a side view of a blade shown in FIG. 7.

Referring now to FIGS. 7 and 8, the blades 10 and 12 are shown in a position with overlapping paths. The shafts 6 and 8 are positioned in a generally parallel relationship. The blades include body portions 50 and 52 with a plurality of projecting teeth, long teeth and short teeth, alternately positioned about the perimeter of the body portions 50 and 52. Between each pair of long teeth shown at 54, 54', and 54", is a short tooth shown at 56, 56' and 56", etc. having a pitch angle. Each short tooth has a leading pitched portion 58 and a trailing pitched portion 62, shown in FIG. 7.

Figure 3:
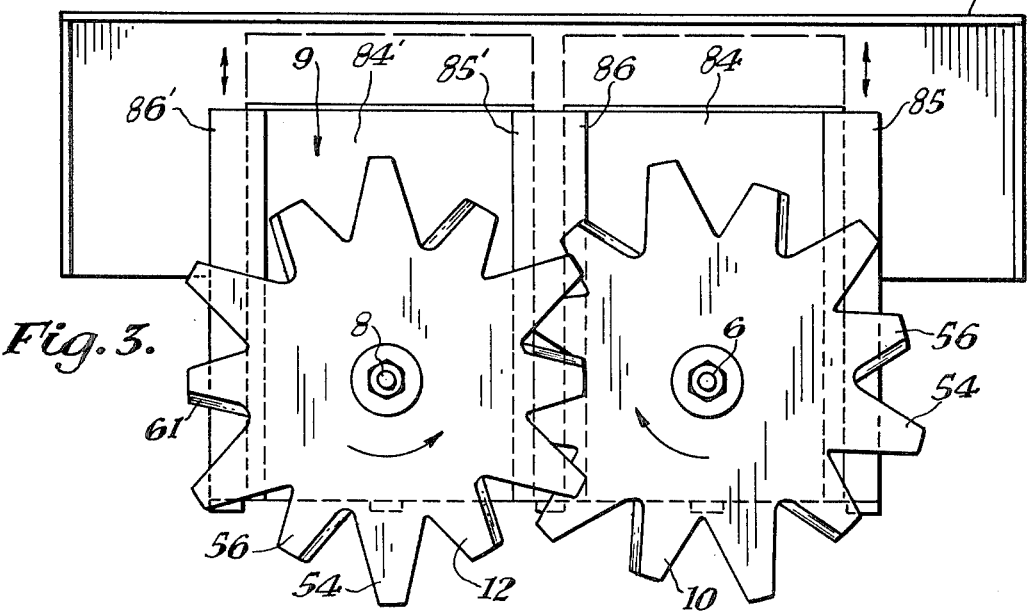
FIG. 3 is a front view of the aquatic weed cutting vehicle.

Tooth 56, as shown in FIG. 3, may include a flat body portion 60. The short tooth 56, may include a wedge-shaped pitched leading and trailing surface as shown at 61 in FIG. 3, and as shown in FIG. 4.

Figure 6:
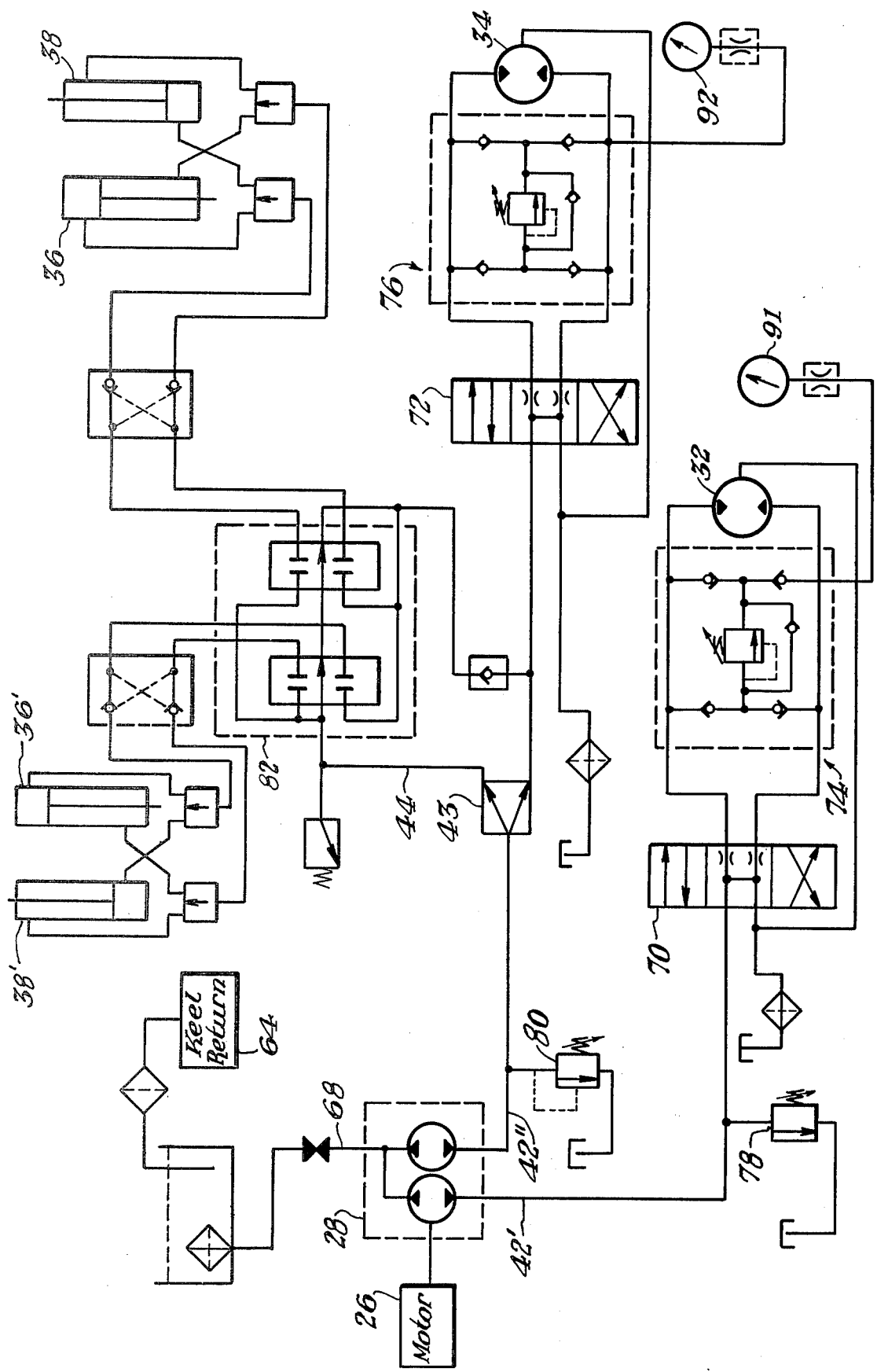
FIG. 6 is a schematic drawing of the hydraulic control system.
Figure 11:
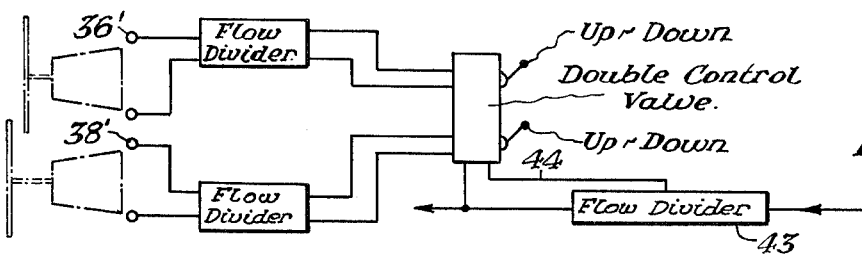
FIG. 11 is a block diagram of the piston circuit.

Referring to FIG. 6, the hydraulic reservoir 64 receives fluid from the systems return conduit in the keel 66, FIG. 2, of the boat. The keel return conduit cools the returning fluid. The pump 28 may be a dual vane hydraulic pump for receiving fluid from the reservoir 64 through pipeline 68. A gate shut-off valve may be placed in line 68. Hydraulic lines 42' and 42" pass the hydraulic fluid under pressure through the blade throttle controls 70 and 74. The throttle controls are four-way pressure compensation flow control means. The throttle controls 70 and 72 control the fluid into the motor controls 74 and 76 to drive the dual vane hydraulic pump motors 32 and 34 and their shafts 6 and 8, respectively, in either a clockwise or counter-clockwise direction. Relief valves 78 and 80 may be placed in line 42' and 42" upstream of the throttle controls 70 and 72.

The hydraulic fluid is connected to the shaft controller 82, a multi-spool control valve, through flow divider 43 and hydraulic line 44, in order to control the movement of pistons 36, 36' and 38, 38'. The pistons 36, 36' and 38, 38' raise and lower the shafts 6 and 8. Each motor 32 and 34 and piston 36, 36' and 38, 38' include return lines, not shown, reservoir 64. The return lines are connected into the keel conduit 66 for cooling the hydraulic fluid.

The blades 10 and 12 are moved up and down, as shown in FIGS. 3, 4, and 5 on frame 7 and 8. The frame members include a base plate 84 and 84', that is movable in track members 85, 86, and 85' and 86'. The cantilevered frame 87 and 87' supports the shafts 6 and 8, motors 32 and 34 and blades 10 and 12. The position of the blades on the shafts may be adjusted by the use of different spaces 88 and 88' rearward of nuts 89 and 89'.

The splash cover 90 is held over the blades 10 and 12. The splash cover 90 is movable with each blade to prevent water from entering the boat. The splash cover forms a column of water to the port and starboard side of the boat when the blades are rotated. The columns of water provide a visual indication means of the type of water bed encountered by each blade. This visual indication means provides a blade depth control indicator for the weed cutter's operator. Pressure gauges 91 and 92 and FIG. 6 also provide an additional control means for the operator to use when he regulates the depth of the blades 10 and 12.

Figure 9:
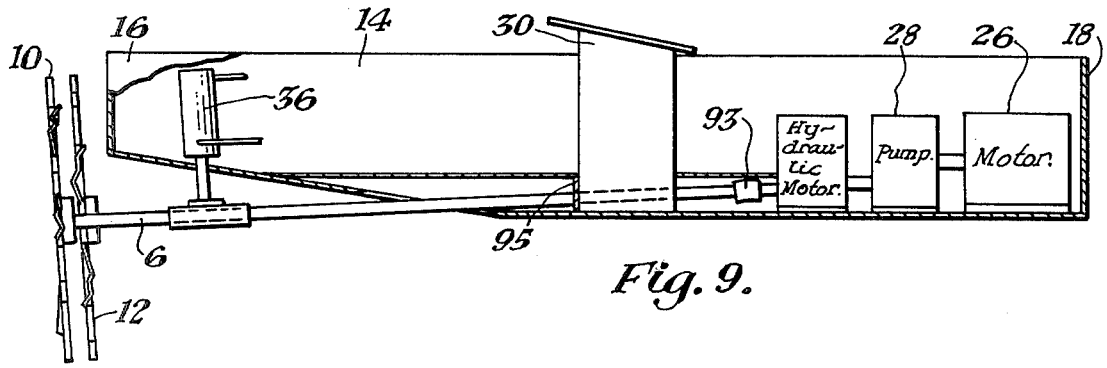
FIG. 9 is a side view partially in cross-section of a second aquatic weed cutter.
Figure 10:
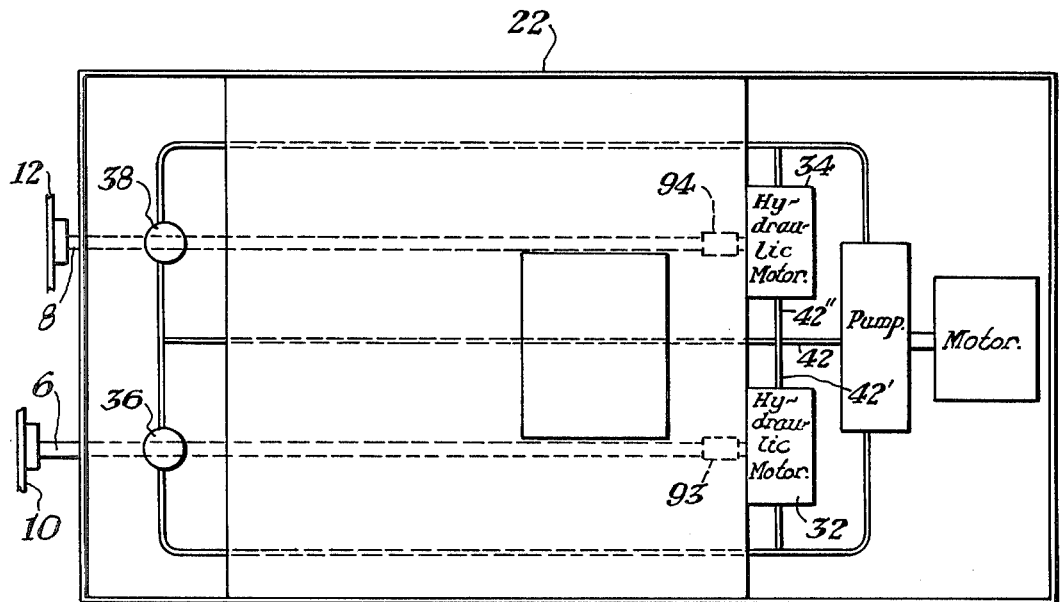
FIG. 10 is a plan view of the second aquatic weed cutter.

FIGS. 9 and 10 show an alternate or secondary arrangement that may be used to raise and lower the shafts 6 and 8 and blades 10 and 12. The shafts include a flexible coupling 93 and 94 that allow the distal ends of the shafts to be raised and lowered by pistons 36 and 38.

The flexible water tight bulk head 95 must be used to protect the water tight integrity of the boat.

In use, the shafts 6 and 8 may be lowered in order to place the path of the distal ends of the longest tooth or both the short and long tooth below the surface of the water bed. The longest teeth 54 chop the root systems and act as a stabilizing means as the blades pass through the bed below the water. The shorter pitched teeth 56 are the propulsion control means for controlling the speed of movement of the vehicle through and across the bed as the root systems are cut and chopped into small pieces. The amount of pitch designed into the teeth provides a steady force at a particular blade speed for driving the vehicle across the water and the bed below the water.

Referring now to FIG. 12, top view of the top of one of the blades 56, one particular pitch of the cutting blade is shown and illustrated. The distal ends of the blade is numbered 100 with the body of the cutting blade lying in a single plane which is numbered 102. The material lying between the distal end 100 of the cutting blade and the body 102 of the cutting blade is illustrated by numeral 104.

Referring to FIG. 13, showing shafts 6 and 8, the cutting blade connecting means for holding the cutting blades 10 and 12 is illustrated. Flange 106 and 106' are connected to shafts 6 and 8 respectively. Various shaped spacers 108, 108' and 108" or others may be placed between the flanges 106 and 106' and nut 89 or 89' in order to secure the position of cutting blades 10 and 12.

The cleaning blades 110 and 110' are shown in FIGS. 13 and 14. The cleaning blades 110 and 110' are positioned on shafts 6 and 8 respectively. The cleaning blades are shaped as shown in FIG. 14. The cleaning blades 110 and 110' have pitched star-like blades projecting out from a body portion. The cleaning blades drive water and material in the direction of the cutting blades. The pitched cleaning blades are numbered 112 in FIG. 14. The cleaning blade is mounted on a round member 114 which is connected to a coupling member 116. The coupling member 116 includes a key opening 118 that is positioned on shafts 6 and 8. The relative longitudinal positioning of blades 10, 12 and 110 and 110' are illustrated in FIG. 13. The cleaning blades may be offset as the cutting blades are in FIG. 13. In use, the cleaning blades are used to drive the material that collects on the solid body portion of the cutting blade between the shaft opening and the base of the teeth off of the body portion of the cutting blade.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An aquatic weed cutter boat for cutting aquatic plants and their root systems, comprising:
   a frame means movably connected to the forward outside end of said boat;
   a drive system operatively connected to said frame means, said drive system including;
   at least one generally circular rotatable blade having a plurality of alternating non-pitched teeth and pitched teeth spaced along the circumference of said blade and extending radially outward, and a drive means having a shaft connected to said circular rotatable blade to rotate said blade;
a cleaning blade connected to said shaft forward of said circular rotatable blade, said cleaning blade pitched to move fluid against said circular rotatable blade to remove cut aquatic weeds; and
a fluid deflector shield fixedly positioned above said circular rotatable blade to deflect the fluid and cut aquatic weeds in a path normal the path of travel of said boat;
said frame means vertically movable in a plane transverse to the path of travel of said boat whereby said circular rotatable blade moves vertically with said frame means to position said blade toward and away from the surface of a soil bed to cut aquatic plants and their root systems;
said pitched teeth pitched rearwardly imparting a rearward direction to the liquid contacting said pitched teeth whereby the resultant force advances said aquatic weed cutter boat along the normal path of travel of said boat, said aquatic weed cutter boat being free from separate propulsion power means.

2. An aquatic weed cutter boat for cutting aquatic plants and their root systems as set forth in claim 1, wherein:
said non-pitched teeth along the circumference of said blade project outwardly from said blade a greater distance than said alternately spaced pitched teeth in a plane transverse to the path of travel of said aquatic weed cutter boat.

* * * * *